United States Patent [19]
Klein et al.

[11] Patent Number: 5,735,373
[45] Date of Patent: Apr. 7, 1998

[54] SHOCK ABSORBER AND A HINGE EYE FOR A SHOCK ABSORBER

[75] Inventors: Alfred K. Klein, Weitersburg; Peter Thurmann, Waldesch; Horst Kaufmann, Burgen; Jörg Gustke, Ochtendung; Horst Maury, Sebastian, all of Germany

[73] Assignee: Stabilus GmbH, Koblenz, Germany

[21] Appl. No.: 573,200

[22] Filed: Dec. 15, 1995

[30] Foreign Application Priority Data

Dec. 17, 1994 [DE] Germany ................ 44 45 233.0

[51] Int. Cl.[6] .................. F16F 9/54; B60G 11/27; F16J 10/12
[52] U.S. Cl. .................. 188/321.11; 403/326
[58] Field of Search .............. 188/321.11, 322.11; 403/326, 327, 329; 285/162, 338, 196; 16/2

[56] References Cited

U.S. PATENT DOCUMENTS

| | | | |
|---|---|---|---|
| 2,243,356 | 5/1941 | Olson | 285/338 |
| 2,503,854 | 4/1950 | Trainor | 403/326 |
| 3,121,583 | 2/1964 | Damm | 403/326 |
| 4,772,152 | 9/1988 | Gill | 403/326 |

FOREIGN PATENT DOCUMENTS

| | | |
|---|---|---|
| 2128210 | 1/1973 | Germany . |
| 8127163 | 3/1982 | Germany . |
| 4228383 | 3/1994 | Germany . |
| 4249633 | 9/1992 | Japan . |
| 1535955 | 12/1978 | United Kingdom . |

*Primary Examiner*—Mathew C. Graham
*Attorney, Agent, or Firm*—Nils H. Ljungman and Associates

[57] ABSTRACT

Hinge eye for a piston-cylinder unit, or shock absorber, in particular for air springs, comprising a bracket with an opening, a bearing surface for a connection shank which is connected to a base body, and at least one retaining tab. The retaining tab is actively connected to the piston-cylinder unit and forms a locking connection with a groove of the connection shank. The retaining tab(s) and the part of the hinge eye which forms the opening with the bearing surface are realized in one piece.

20 Claims, 4 Drawing Sheets

SHOCK ABSORBER AND A HINGE EYE FOR A SHOCK ABSORBER

BACKGROUND OF THE INVENTION

1. Field of the Invention

Generally, the present invention relates to a hinge eye for a piston-cylinder unit, or shock absorber, in particular for an air spring, or pneumatic spring, the air or pneumatic spring comprising a bracket with an opening, a bearing surface for a connection shank, or pin, which is connected to a base body, and at least one retaining tab which is actively connected to the piston-cylinder unit and forms a locking connection with a groove of the connection shank.

2. Background Information

A known hinge eye, similar to that described above, is disclosed, for example, in German Utility Model Gm 81 27 163. The fixing means used in this known device comprises a retaining clamp which is connected to the bracket of the hinge eye. Retaining tabs on the retaining clamp are engaged in a groove in a shank of the base body, e.g. a vehicle body or another such body which, in a large number of applications, has a hinged element, lid, or flap, which is assisted by means of a piston-cylinder unit, in particular a pneumatic spring. Some of the disadvantages of this solution are that the retaining clamp is made of a spring steel which essentially requires special measures to protect it against corrosion. It can also be essentially impossible to prevent damage to the coat of paint between the clamp and the shank. The retaining clamp in itself, as illustrated in FIGS. 2-4 of the above-referenced utility model, can be quite complicated and correspondingly expensive, As a further disadvantage, the cross section of the known hinge eye is reduced in the vicinity of the depressions.

OBJECT OF THE INVENTION

The object of the present invention is to create a hinge eye which can essentially be installed easily and reliably, and can essentially eliminate the disadvantages of similarly known devices.

SUMMARY OF THE INVENTION

The present invention teaches that this object can be accomplished, in accordance with at least one preferred embodiment, by an arrangement in which the retaining tab(s) and the part of the hinge eye which forms the opening with the bearing surface are realized as one piece. The disadvantages associated with the spring clamp, such as the need for protection against corrosion and a loss of strength of the hinge eye, are essentially eliminated. When a separate part is required, there can be the possibility that the part will be installed incorrectly or will be left out altogether. Even with a very high level of quality control, it can essentially never be possible to eliminate this problem altogether. But the problem essentially cannot occur with a hinge eye contemplated by the present invention.

As contemplated in accordance with one preferred embodiment of the present invention, the retaining tab(s) is/are realized with radial elasticity. Essentially no assembly or installation tools are required. The retaining tabs can make an easy installation possible, essentially without having to accept any reduction in performance with regard to the holding force.

The retaining tabs are also located between boundary segments. The boundary segments protect the retaining tabs from damaging external forces. Likewise, the boundary segments perform a protective function for the retaining tabs, in that they prevent the retaining tabs from becoming snagged on any objects.

The present invention teaches that it is advantageous if the boundary segments are realized in the shape of a circular arc. In that case, the amount of space they occupy can essentially be the optimum. The present invention teaches that the dimension of the external contour of the boundary segments is at least as great as the distance between the center of the opening and the outside of the retaining tabs. So that no forces which could damage the retaining tabs can be applied from the axial direction, the boundary segments, in relation to the bracket, are preferably at least as high as the retaining tab(s).

In one alternative embodiment, the retaining tab(s) and the opening are formed by a bushing inside the bracket. This arrangement can make it possible to select a specific combination of materials for the bracket and the bushing. For example, the bracket can be made of a very hard and inelastic material. On the other hand, the material for the bushing can be selected on the basis of its coefficient of friction.

In accordance with at least one embodiment of the present invention, the boundary segments are integral components of the bushing. The three-dimensional shape of the bracket can thereby essentially be significantly simplified. As a result of these measures it can become possible to have the boundary segments form a radial shoulder which is supported on one side of the bracket, and by means of which the bushing is fixed in place axially inside the bracket. To fix the bushing in position axially, the bushing has an additional axial shoulder for the other side of the bracket. In addition, there can also be a non-rotational connection between the bushing and the bracket. It can thereby be essentially guaranteed that, under essentially all operating conditions, the relative movement will take place between the shank and the bushing, and not between the bushing and the bracket.

The present invention also teaches that the retaining tabs have bevels which effect a radial widening of the retaining tabs during installation. Essentially, the installer simply presses the hinge axis onto the shank on which the piston-cylinder unit is to be supported. The bevels move onto the shank, whereby the axial movement is converted into a widening of the retaining tabs.

To adjust for any tolerances between the shank and the bearing surface of the hinge eye, the bearing surface is provided with elastically deformable webs which run essentially axially. Even if the shank is manufactured with great precision, there can be significant fluctuations in tolerance, e.g. on account of fluctuations in the thickness of the coat of paint. The elastic webs are deformed to make adjustments for an excessively tight fit.

In a realization in which essentially only transverse forces are expected, the bracket is guided by means of its retaining tabs between the groove in the shank and the base body. The retaining tabs and the base body are used to secure the bracket. The bushing can be simplified by excluding the additional shoulder, which also reduces the manufacturing costs.

For reasons of weight and ease of manufacture, the hinge eye can be made of plastic. Plastic is also an appropriate material for the realization of the retaining tabs.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a shock absorber assembly comprising: a shock absorber, the shock absorber comprising: a sealed cylinder defining a chamber therein, the cylinder containing a damping fluid; a piston rod sealingly projecting into the cylinder and being axially displaceable with respect to the cylinder; a piston being attached to the piston rod, the piston being slidably disposed within the cylinder to sealingly divide the chamber into first and second chambers; means for permitting flow of damping fluid between the first and second chambers; a central longitudinal axis defined through the sealed cylinder, the central longitudinal axis defining a longitudinal direction of the shock absorber; a first end and a second end disposed substantially opposite one another along the longitudinal axis of the shock absorber; a pneumatic spring for applying a substantially longitudinally directed force to the end surface portion of the cylinder, to longitudinally displace the cylinder; the pneumatic spring comprising: a receptacle accommodating a portion of the cylinder of the shock absorber; means for applying the substantially longitudinally directed force to the end surface portion of the shock absorber, to longitudinally displace the cylinder; the means for applying the substantially longitudinally directed force comprising membrane means for providing the substantially longitudinally directed force; means for transferring the substantially longitudinally directed force provided by the membrane means to the end portion of the shock absorber; means for connecting the membrane means to the force transferring means; the first end comprising means for connecting to a first element; the second end comprising means for connecting to a second element; the first end means for connecting comprising a hinge eye; the hinge eye comprising means for receiving a connecting shank; the hinge eye comprising at least one retaining tab for locking the hinge eye into a groove on a connecting shank, which connecting shank is disposed on a first element; the hinge eye comprising a portion, the portion comprising a singular unitary, homogeneous, integral body; the body comprising the at least one retaining tab; the body comprising at least one opening for receiving, holding, and making contact with a connecting shank; the at least one opening having a central longitudinal axis and a radial direction substantially transverse to the central longitudinal axis; and the at least one opening comprising a periphery disposed radially with respect to the central longitudinal axis of the at least one opening.

Another aspect of the present invention resides broadly in a shock absorber gas spring assembly, a hinge eye comprising a bracket with an opening, a bearing surface for a connection shank which is connected to a base body, and at least one retaining tab which is actively connected to the piston-cylinder unit and forms a locking connection with a groove of the connection shank, characterized by the fact that the retaining tab(s) and the part of the hinge eye which forms the opening with the bearing surface are realized as one piece.

BRIEF DESCRIPTION OF THE DRAWINGS

The invention is described in greater detail below, with reference to the embodiments illustrated in the accompanying figures.

DESCRIPTION OF THE PREFERRED EMBODIMENT

Figure 1:
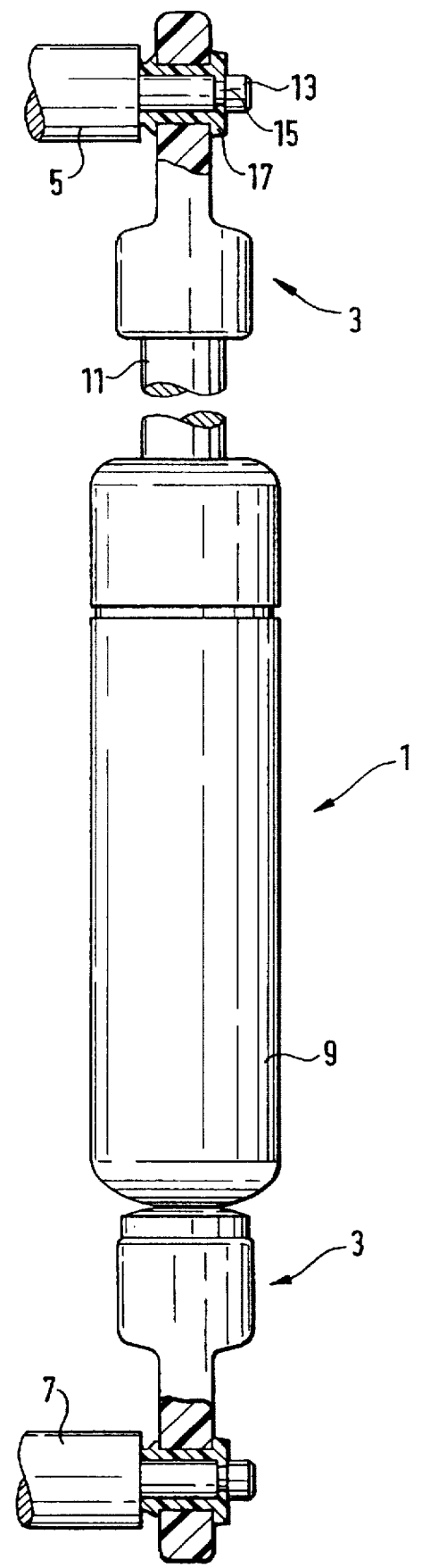
FIG. 1 shows a piston-cylinder unit in the form of an air spring with a hinge bracket on a shank.

FIG. 1 shows a piston-cylinder unit 1 constructed in the form of an air spring which can be connected to a first base body 5 and a second base body 7 by means of hinge eyes 3. Sample applications include, for example, a vehicle hood or a spring which can make it easier to raise lids on furniture. The piston-cylinder unit 1 can include a cylinder 9, in which cylinder 9 a piston rod 11 can be guided so that it can move essentially axially. The cylinder 9 and the piston rod 11 can each have a hinge eye 3 which can be supported on a connection shank 13 of the individual base bodies 5, 7. The connection shank 13 can have a groove 15 in which the retaining tabs 17 of the hinge eye 3 are preferably engaged.

Figure 2A:
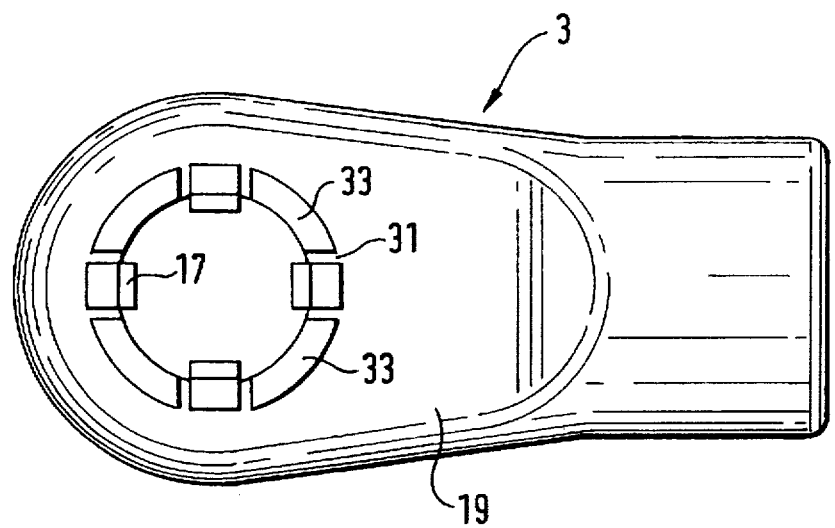
FIGS. 2A and 2B show a one-piece hinge bracket.
Figure 2B:
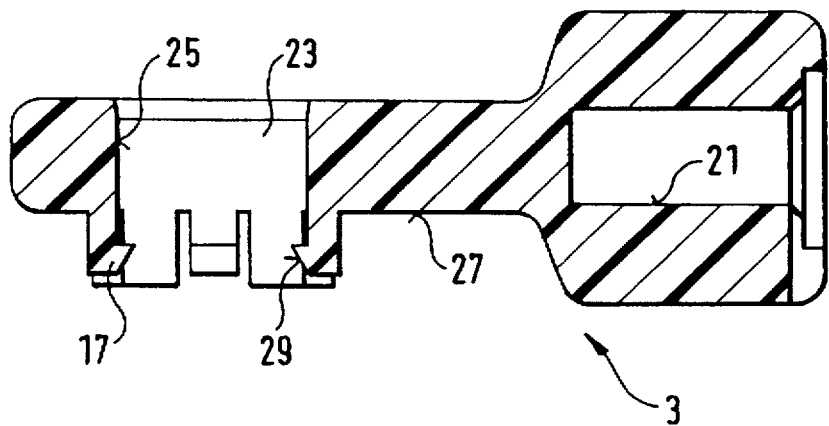

FIGS. 2A and 2B show a hinge eye 3 in isolation. The hinge eye 3 essentially comprises a bracket 19 which can preferably be connected to the piston-cylinder unit 1 by means of a connection opening 21. For the connection shank, there can be an opening 23, the shell surface of which can represent a bearing surface 25 for the connection shank. On one upper side 27 of the bracket 19, there can be a multiplicity of retaining tabs 17 arranged on a common arc. The number of retaining tabs 17 can be arbitrary, and can essentially be determined on the basis of the space available and the forces which could be transmitted. FIG. 2B shows the L-shaped cross section of the retaining tabs 17. During the installation, the hinge eye 3 is preferably pushed onto the connection shank. The bevelled portions 29 preferably slide over the connection shank, whereby the axial sliding movement over the bevels 29 is essentially converted into a radial, elastic expanding movement of the retaining tabs 17. As soon as the retaining tabs 17 have reached the groove in the connection shank, a locked connection is essentially created between the hinge eye 3 and one of the base bodies 5, 7.

For protection against external forces, the retaining tabs 17 preferably lie inside intermediate spaces 31 which can be formed by boundary segments 33. The boundary segments 33 can be realized in the form of circular arcs, and allow only one radial degree of freedom for the retaining tabs 17.

As also shown in FIG. 2B, the boundary segments 33, in relation to the bracket 19, are higher than the retaining tabs 17, so that the protective action of the boundary segments 33 can be substantially comprehensive or all-encompassing. Preferably, plastic can be the material used for the hinge eye 3.

Figure 3A:
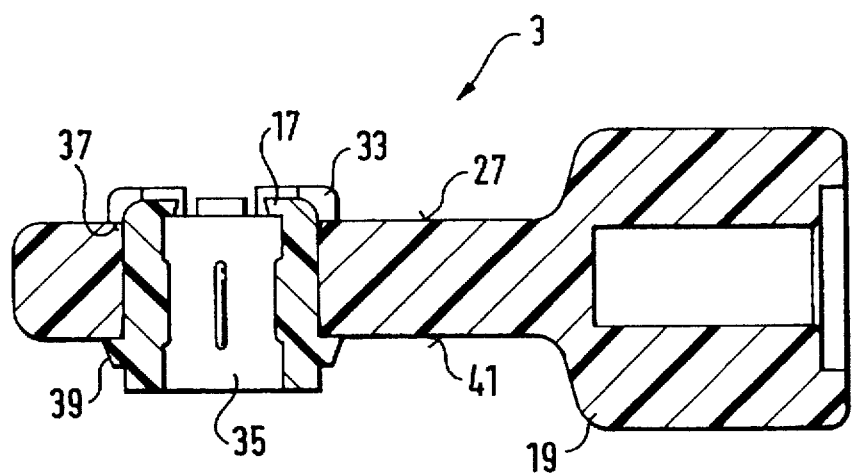
FIGS. 3A and 3B show a hinge bracket with a separate bushing.
Figure 3B:
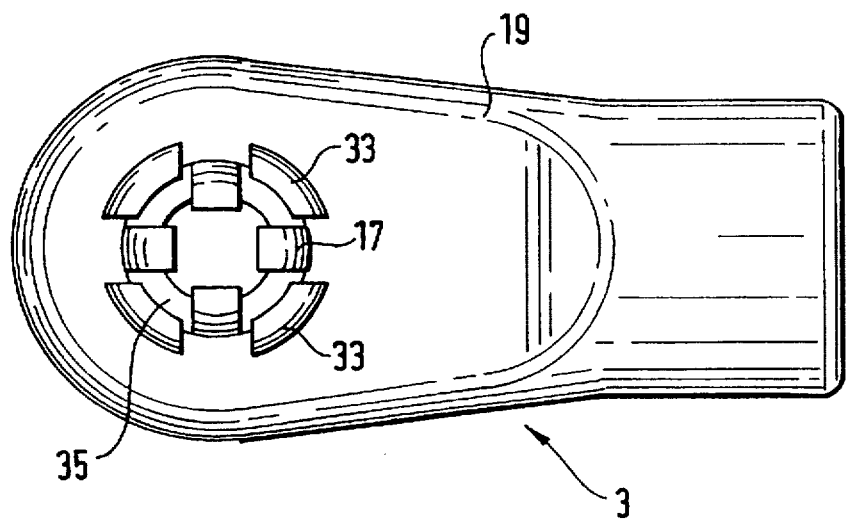

FIGS. 3A and 3B are enlarged illustrations of the embodiment of a hinge eye 3 used in FIG. 1. A primary difference from the hinge eye illustrated in FIGS. 2A and 2B is that a bushing 35 is used. A purpose of this measure is to make it possible to use a material for the bracket 19 which i.e. substantially optimal in terms of strength, and a material for the bearing surface 25 which would preferably have a low coefficient of friction. In addition to the bearing surface 25, the bushing 35 can also have the retaining tabs 17 and the boundary segments 33. The bracket 19 and the bushing 35 can be manufactured jointly in a single injection molding process, so that the entire hinge eye 3 is preferably in the form of a finished subassembly ready for installation.

An additional difference from FIGS. 2A and 2B is that the boundary segments 33 have an essentially larger diameter than the retaining tabs 17. The result can be the formation of a shoulder 37 for the upper side 27 of the bracket 19. An additional shoulder 39 which can be supported on the underside 41 of the bracket 19 preferably prevents any unintentional displacement of the bushing 35 inside the bracket 19. The bushing 35 can be non-rotationally fixed in place inside the bracket 19. A simple force fit can be used between the bracket 19 and the bushing 35, or, for example, during the manufacture of the hinge eye 3, a boundary segment 33 can be injected into the bracket 19 and an interlocking connection can be formed.

Figure 4A:
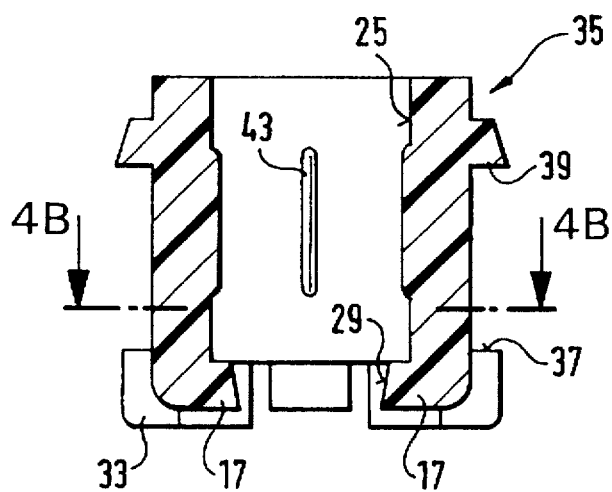
FIGS. 4A–D illustrate cross sections of a bushing.
Figure 4B:
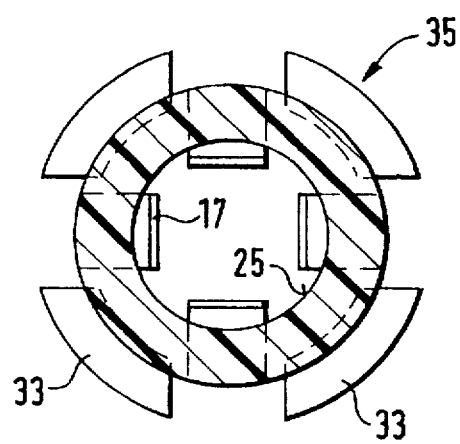
Figure 4C:
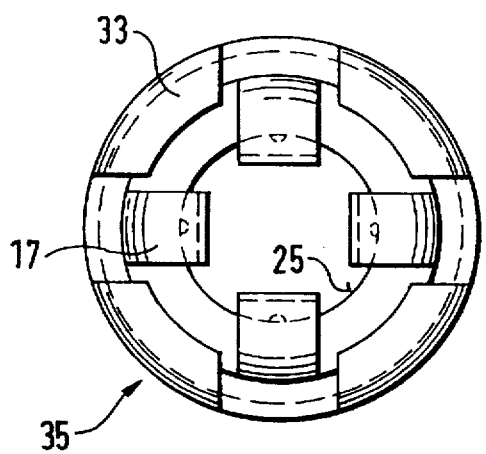
Figure 4D:
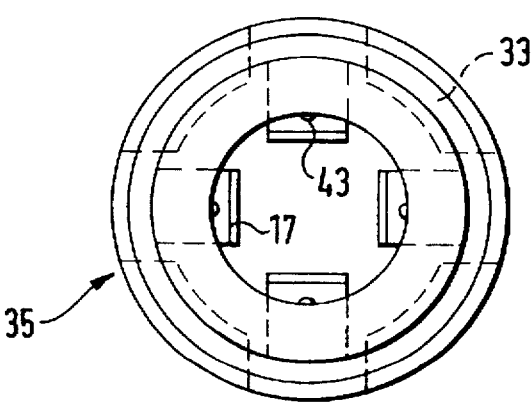

In FIGS. 4A to 4D, the injected bushing 35 is shown in isolation. FIG. 4A also shows the elastic webs 43 which can preferably be used to make adjustments for tolerances between the connection shank 13 of the base bodies 5, 7 and the bearing surface 25. Of course, the webs 43 can also be used in the embodiment illustrated in FIGS. 2A and 2B. FIG. 4B corresponds to a cross section along Plane 4B in FIG. 4A. FIGS. 4C and 4D show views from above the bushing 35 and below the bushing 35, respectively. If the forces involved and the dynamic conditions allow, the additional shoulder 39 can also be omitted.

In the installation illustrated in FIG. 1, the bracket 19 can then be guided between the retaining tabs 17 and the base body 5, 7. The bushing 35 can also be manufactured using other methods.

In one embodiment of the present invention, the connection shank 13 of the base body 5, 7 can have a groove 15, as shown in FIG. 1. As the connection shank 13 is inserted into the bushing 35 (shown in FIG. 4A), the elastic webs 43 allow the shank to move in the direction of the retaining tabs 17. The elastic webs 43 preferably take up some clearance or play between the bushing 35 and the shank. Various numbers, sizes, and configurations of webs can be employed in this manner, depending on the requirements of the situation. The end of the shank 13, as it moves into the bushing 35, pushes the bevelled portions 29 aside, allowing the shank 13 to slide further into the bushing 35. As the grooved portion of the shank 13 reaches the tabs 17, the tabs 17 recoil to their original configuration and into the groove of the shank 13, thus grasping the shank 13. Essentially, the connection described herein is a "snap" connection.

Generally, the phenomena described hereinabove can be involved in other embodiments of the present invention.

If not otherwise stated hereinabove, it should generally be understood that the terms "piston-cylinder", "air spring", "pneumatic spring", and "pneumatic shock absorber" as used and discussed above with relation to FIGS. 1–4D may, if appropriate, essentially be considered to be interchangeable.

If not otherwise stated hereinabove, it should generally be understood that the terms "tab", "tabs", and "tab(s)" as used and discussed above with relation to FIGS. 1–4D may, if appropriate, essentially be considered to be interchangeable.

One feature of the invention resides broadly in the hinge eye for a piston-cylinder unit, in particular an air spring, or pneumatic spring, comprising a bracket with an opening, a bearing surface for a connection shank, or pin, which is connected to a base body, and at least one retaining tab which is actively connected to the piston-cylinder unit and forms a locking connection with a groove of the connection shank, characterized by the fact that the retaining tab(s) 17 and the part of the hinge eye 3 which forms the opening 23 with the bearing surface 25 are realized as one piece.

Another feature of the invention resides broadly in the hinge eye characterized by the fact that the retaining tab(s) 17 is/are realized with radial elasticity.

Yet another feature of the invention resides broadly in the hinge eye characterized by the fact that the retaining tabs 17 are located between boundary, or delimitation segments 33.

Still another feature of the invention resides broadly in the hinge eye characterized by the fact that the boundary elements 33 are realized in the shape of circular arcs.

A further feature of the invention resides broadly in the hinge eye characterized by the fact that the dimension of the external contour of the boundary segments 33 is at least as large as the distance between the center of the opening and the outside of the retaining tab(s) 17.

Another feature of the invention resides broadly in the hinge eye characterized by the fact that the boundary segments, in relation to the bracket, are at least as high, or tall, as the retaining tab(s).

Yet another feature of the invention resides broadly in the hinge eye characterized by the fact that the retaining tab(s) and the opening are formed by a bushing 35 inside the bracket.

Still another feature of the invention resides broadly in the hinge eye characterized by the fact that the boundary segments are a component of the bushing 35.

A further feature of the invention resides broadly in the hinge eye characterized by the fact that the boundary segments form a radial shoulder 37 which is supported on one side 27 of the bracket and by means of which the bushing is fixed in position axially inside the bracket.

Another feature of the invention resides broadly in the hinge eye characterized by the fact that the bushing has an additional axial shoulder 39 for the other side of the bracket.

Yet another feature of the invention resides broadly in the hinge eye characterized by the fact that there is a non-rotational connection between the bushing and the bracket.

Still another feature of the invention resides broadly in the hinge eye characterized by the fact that the retaining tabs 17 have bevels 29 which, during assembly, produce an expansion of the retaining tabs in the radial direction.

A further feature of the invention resides broadly in the hinge eye characterised by the fact that the bearing surface 25 is provided with elastically deformable webs 43 which run essentially axially.

Another feature of the invention resides broadly in the hinge eye characterized by the fact that the bracket 19 is guided by means of its retaining tabs 17 between the groove 15 in the connection shank 13 and the base body 5, 7.

Yet another feature of the invention resides broadly in the hinge eye characterized by the fact that the hinge eye is made of plastic.

Some examples of piston-cylinder assemblies and various components associated therewith which could possibly utilize the present invention may be disclosed in the following U.S. Patents: U.S. Pat. No. 4,155,144 to Koganei, entitled "Damper Device"; U.S. Pat. No. 4,653,735 to Buma, entitled "Suspension for Vehicle"; and U.S. Pat. No. 4,795,009 to Tanahashi and Hayashi, entitled "Twin-tube Type Shock Absorber".

Some examples of air spring assemblies and various components and applications associated therewith which could possibly utilize the present invention may be disclosed in the following U.S. Patents: U.S. Pat. No. 4,741,517 issued May 3, 1988 to Warmuth, et al., entitled "Air Spring with Extensible Fabric Restraining Cylinder"; U.S. Pat. No. 4,709,896 issued Dec. 1, 1987 to Wahls and Gryp, entitled "In-seat Suspension"; U.S. Pat. No. 4,635,961 issued Jan. 13, 1987 to Lew, entitled "Air-spring Suspension"; and U.S.

Pat. No. 5,454,455 issued Oct. 3, 1995 to Kundmuller and Christel, entitled "Cylinder Piston Device".

Some examples of piston-cylinder hinge eyes, joints, and various components associated therewith which may be utilized with the present invention may be found in the following U.S. Patents: U.S. Pat. No. 4,326,733 to Rubalcava, entitled "Hydro-pneumatic Suspensions for Automotive Vehicles"; U.S. Pat. No. 5,338,055 to Mauz, entitled Independent Wheel Suspension"; U.S. Pat. No. 5,133,575 to Zantinge and Aalderink, entitled "Vehicle with Axle Suspension Device with Gas Spring Suspension and Control System Therefor"; U.S. Pat. No. 4,635,745 to Myers et al., entitled "Vehicle Air Suspension"; and U.S. Pat. No. 4,577,840 to Meller et al., entitled "Self-pumping Hydropneumatic Spring Leg or Strut with Internal Level Control for Motor Vehicles".

Some examples of plastic materials which may be utilized with the present invention may be disclosed in the following U.S. Patents: U.S. Pat. No. 4,659,766 issued Apr. 21, 1987 to Falk and Kliever, entitled "Graft Copolymer-plasticized PVC Blends as Thermoplastic Elastomers"; U.S. Pat. No. 4,957,962 issued Sep. 18, 1990 to Winkler et al., entitled "Fiber Composites"; and U.S. Pat. No. 5,004,784 issued Apr. 2, 1991 to Huynh-Ba, entitled "Polymer Blends Containing Isocyanate Reacting Agents".

Some examples of low coefficient of friction materials which may be utilized with the present invention may be disclosed in the following U.S. Patents: U.S. Pat. No. 4,714,740 issued Dec. 22, 1987 to Lee and Golden, entitled "Low Coefficient of Friction Nylon Blend"; U.S. Pat. No. 4,654,235 issued Mar. 31, 1987 to Effenberger et al., entitled "Novel Wear Resistant Fluoropolymer-containing Flexible Composites and Method for Preparation Thereof"; and U.S. Pat. No. Re32514 (reissue of U.S. Pat. No. 4,473,676) issued Oct. 6, 1987 to Steklenski, entitled "Polymer Compositions Having a Low Coefficient of Friction".

Some examples of piston-cylinder hinge eyes, joints, and various components associated therewith which may be utilized with the present invention may be found in the following patent publications: Federal Republic of Germany Laid-Open Patent Application No. DE-OS 43 39 448.5, filed Nov. 19, 1993.

The appended drawings in their entirety, including all dimensions, proportions and/or shapes in at least one embodiment of the invention, are accurate and are hereby included by reference into this specification.

All of the patents, patent applications and publications recited herein are hereby incorporated by reference as if set forth in their entirety herein.

The corresponding foreign patent publication applications, namely, Federal Republic of Germany Patent Application No. P 44 45 233.0, filed on Dec. 17, 1994, having inventors Alfred K. Klein, Peter Thurmann, Horst Kaufmann, Jörg Gustke, and Horst Maury, and DE-OS P 44 45 233.0 and DE-PS P 44 45 233.0, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber assembly comprising:

a shock absorber, said shock absorber comprising:
  said shock absorber having a longitudinal axis;
  a first end portion and a second end portion disposed substantially opposite one another along the longitudinal axis of said shock absorber;

said first end portion comprising means for connecting said first end portion to a first element;

said second end portion comprising means for connecting said second end portion to a second element;

said means for connecting said first end portion comprising a hinge eye;

said hinge eye comprising means for receiving a connecting shank;

said means for receiving a connecting shank comprising:
  at least one opening therein for receiving, holding, and making contact with a connecting shank; and
  at least one retaining tab for locking said hinge eye into a groove on a connecting shank;

said at least one opening having a central longitudinal axis and a radial direction substantially transverse to the central longitudinal axis;

said at least one opening comprising a periphery disposed radially from the central longitudinal axis of said at least one opening to receive a connecting shank;

said means for receiving a connecting shank comprising a single, solid piece;

said at least one retaining tab being integral with said periphery immediately adjacent said at least one retaining tab of said at least one opening; and said integral combination of said at least one retaining tab and said periphery being one homogeneous, molded material.

2. The shock absorber according to claim 1, wherein:

said at least one retaining tab is disposed at said at least one opening; and said at least one retaining tab being elastic in at least a first direction, said first direction being substantially a radial direction.

3. The shock absorber according to claim 2, wherein:

said hinge eye comprises means for protecting said at least one retaining tab; and said protecting means is disposed substantially radially about said at least one opening and substantially adjacent said at least one retaining tab.

4. The shock absorber according to claim 3 wherein:

said hinge eye comprises a first surface and a second surface;

said first and second surfaces being planar and substantially parallel with respect to one another;

said first and second surfaces being disposed substantially perpendicular to the central longitudinal axis of said at least one opening;

said protecting means comprises at least one protecting segments said at least one protecting segment having a contour;

said contour of said at least one protecting segment being at least a portion of a cylinder, said contour having a longitudinal axis substantially parallel to the central longitudinal axis of said at least one opening, and having a height dimension extending outward substantially parallel to the central longitudinal axis of said at least one opening; and said at least one retaining tab having a longitudinal axis substantially parallel to the central longitudinal axis of said at least one opening, and having a height dimension extending outward substantially parallel to the central longitudinal axis of said at least one opening.

5. The shock absorber according to claim 4, wherein:

said at least one protecting segment has a radial thickness;

said at least one retaining tab has a radial thickness;

said radial thickness of said at least one protecting segment being at least as great as said radial thickness of said at least one retaining tab;

said at least one retaining tab has a longitudinal dimension;

said at least one protecting segment has a longitudinal dimension; and said longitudinal dimension of said at least one protecting segment being at least as great as said longitudinal dimension of said at least one retaining tab.

6. The shock absorber according to claim 5, wherein:

said means for receiving a connecting shank comprises a bushing;

said bushing comprises said at least one retaining tab and said at least one opening; and said bushing comprises said at least one protecting segment.

7. The shock absorber according to claim 6, wherein:

said bushing comprises means for axially fixing said bushing within said hinge eye;

said hinge eye comprises means for supporting said means for axially fixing said bushing within said hinge eye;

said means for supporting said means for axially fixing being at least one of:
said first surface of said hinge eye; and
said second surface of said hinge eye;

said means for axially fixing said bushing comprises at least one shoulder portion;

said at least one shoulder portion having a longitudinal dimension and a radial thickness;

said longitudinal dimension of said at least one shoulder portion being at least as great as said longitudinal dimension of said at least one protecting segment;

said radial thickness of said at least one shoulder portion being at least as great as said radial thickness of said at least one protecting segment;

said at least one shoulder portion comprises at least one of a first shoulder portion and a second shoulder portion;

said first shoulder portion being disposed adjacent said first surface of said hinge eye;

said second shoulder portion being disposed adjacent said second surface of said hinge eye; and said means for axially fixing said bushing within said hinge eye being at least one of:
a) said first shoulder portion; and
b) said second shoulder portion.

8. The shock absorber according to claim 7, wherein:

said hinge eye comprises means for reducing play and accomodating for tolerances between said periphery of said at least one opening and a connecting shank;

said means for reducing play and accomodating comprises at least one web disposed about said periphery of said at least one opening;

said at least one web having a longitudinal axis, the longitudinal axis of said at least one web being substantially parallel to the central longitudinal axis of said at least one opening;

said at least one web being substantially elastic; and said at least one web comprises a plurality of webs.

9. The shock absorber according to claim 8, wherein:

said means for receiving a connecting shank comprises means for guiding said hinge eye on a connecting shank; and said means for guiding is said at least one retaining tab.

10. The shock absorber according to claim 9 wherein:

said hinge eye comprises a plastic material; and said first shoulder portion is continuous with said at least one protecting segment.

11. The shock absorber according to claim 1, wherein:

said hinge eye comprises means for radially outwardly expanding said at least one retaining tab upon assembly of said hinge eye and a connecting shank;

said at least one retaining tab having a bevelled face;

said bevelled face of said at least one retaining tab facing substantially toward the central longitudinal axis of said at least one opening; and said bevelled face of said at least one retaining tab being said means for expanding said at least one retaining tab.

12. The shock absorber according to claim 11, wherein:

said hinge eye comprises means for reducing play and accomodating for tolerances between said at least one opening and a connecting shank;

said means for reducing play and accomodating comprises at least one web disposed about said periphery of said at least one opening;

said at least one web having a longitudinal axis, the longitudinal axis of said at least one web being substantially parallel to the central longitudinal axis of said at least one opening;

said at least one web being substantially elastic; and said at least one web comprises a plurality of webs.

13. The shock absorber according to claim 2, wherein:

said means for receiving a connecting shank comprises means for guiding said hinge eye on a connecting shank; and said means for guiding is said at least one retaining tab.

14. The shock absorber according to claim 13, wherein said hinge eye comprises a plastic material.

15. A piston-cylinder assembly, having a longitudinal axis, said piston-cylinder assembly comprising:

a first end portion and a second end portion disposed substantially opposite one another along the longitudinal axis of said piston-cylinder assembly;

said first end portion comprising means for connecting said first end portion to a connecting shank;

said means for connecting said first end portion comprising a hinge eye;

said hinge eye comprising a first surface and a second surface;

said first and second surfaces being opposite one another;

said hinge eye comprising means for receiving a connecting shank;

said means for receiving a connecting shank comprising a bushing;

said bushing comprising at least one retaining tab for locking said hinge eye into a groove on a connecting shank and at least one opening for receiving, holding, and making contact with a connecting shank;

said bushing comprising means for protecting said at least one retaining tab;

said protecting means comprising at least one protecting segment;

said bushing comprising means for axially fixing said bushing within said hinge eye;

said means for axially fixing said bushing within said hinge eye comprising at least one shoulder portion;

said at least one shoulder portion comprising a first shoulder portion; and said first shoulder portion being disposed adjacent said first surface of said hinge eye.

16. The piston-cylinder assembly according to claim 15, wherein:

said at least one shoulder portion comprises a second shoulder portion;

said second shoulder portion being disposed adjacent said second surface of said hinge eye;

said hinge eye comprises means for supporting said means for axially fixing said bushing within said hinge eye;

said means for supporting said means for axially fixing being at least one of:
said first surface of said hinge eye; and
said second surface of said hinge eye.

17. The piston-cylinder assembly according to claim 16, wherein:

said bushing is non-rotationally connected to said hinge eye to prevent said bushing from rotating within said hinge eye;

said at least one retaining tab and said at least one opening of said bushing are disposed within said hinge eye; and said bushing is molded into said hinge eye to form one piece.

18. The piston-cylinder assembly according to claim 17, wherein:

said at least one retaining tab is disposed at said at least one opening;

said at least one retaining tab being elastic in at least a first direction, said first direction being substantially a radial direction;

said protecting means is disposed substantially radially about said at least one opening and substantially adjacent said at least one retaining tab;

said at least one opening having a central longitudinal axis and defining a radial direction substantially transverse to the longitudinal axis of the piston-cylinder assembly;

said at least one opening comprising a periphery disposed radially from the central longitudinal axis of said at least one opening;

said first and second surfaces being disposed substantially perpendicular to the central longitudinal axis of said at least one opening;

said at least one protecting segment having a contour;

said contour of said at least one protecting segment comprising at least a portion of a cylinder, said contour having a longitudinal axis substantially parallel to the central longitudinal axis of said at least one opening, and having a height dimension extending outward substantially parallel to the central longitudinal axis of said at least one opening;

said at least one retaining tab having a longitudinal axis substantially parallel to the central longitudinal axis of said at least one opening, and having a height dimension extending outward substantially parallel to the central longitudinal axis of said at least one opening;

said at least one protecting segment has a radial thickness;

said at least one retaining tab has a radial thickness;

said radial thickness of said at least one protecting segment being at least as great as said radial thickness of said at least one retaining tab;

said at least one retaining tab has a longitudinal dimension;

said at least one protecting segment has a longitudinal dimension;

said longitudinal dimension of said at least one protecting segment being at least as great as said longitudinal dimension of said at least one retaining tab;

said at least one shoulder portion having a longitudinal dimension and a radial thickness;

said longitudinal dimension of said at least one shoulder portion being at least as great as said longitudinal dimension of said at least one protecting segment;

said radial thickness of said at least one shoulder portion being at least as great as said radial thickness of said at least one protecting segment;

said hinge eye comprises means for reducing play and accomodating for tolerances between said periphery of said at least one opening and a connecting shank;

said means for reducing play and accomodating comprises at least one web disposed about said periphery of said at least one opening;

said at least one web having a longitudinal axis, the longitudinal axis of said at least one web being substantially parallel to the central longitudinal axis of said at least one opening;

said at least one web being substantially elastic;

said at least one web comprises a plurality of webs;

said means for receiving a connecting shank comprises means for guiding said hinge eye on a connecting shank;

said means for guiding comprises said at least one retaining tab;

said hinge eye comprises a plastic material; and said first shoulder portion is continuous with said at least one protecting segment.

19. The piston-cylinder assembly according to claim 17, wherein:

said hinge eye comprises means for radially outwardly expanding said at least one retaining tab upon assembly of said hinge eye and a connecting shank;

said at least one retaining tab having a bevelled face;

said bevelled face of said at least one retaining tab facing substantially toward the central longitudinal axis of said at least one opening;

said bevelled face of said at least one retaining tab comprising said means for expanding said at least one retaining tab;

said hinge eye comprises means for reducing play and accomodating for tolerances between said at least one opening and a connecting shank;

said means for reducing play and accomodating comprises at least one web disposed about said periphery of said at least one opening;

said at least one web having a longitudinal axis, the longitudinal axis of said at least one web being substantially parallel to the central longitudinal axis of said at least one opening;

said at least one web being substantially elastic;

said at least one web comprising a plurality of webs;

said means for receiving a connecting shank comprising means for guiding said hinge eye on a connecting shank;

said means for guiding comprising said at least one retaining tab; and said hinge eye comprising a plastic material.

20. A piston-cylinder assembly, having a longitudinal axis, said piston-cylinder assembly comprising: a first end portion and a second end portion disposed substantially opposite one another along the longitudinal axis of the piston-cylinder assembly;

said first end portion comprising means for connecting said first end portion to a connecting shank;

said means for connecting said first end portion comprising a hinge eye;

said hinge eye comprising a first surface and a second surface;

said first and second surfaces being opposite one another;

said hinge eye comprising means for receiving a connecting shank;

said means for receiving a connecting shank comprising a bushing;

said bushing comprising at least one retaining tab for locking said hinge eye into a groove on a connecting shank and at least one opening for receiving, holding, and making contact with a connecting shank;

said bushing comprising means for protecting said at least one retaining tab;

said protecting means comprising at least one protecting segment;

said bushing comprising means for axially fixing said bushing within said hinge eye;

said means for axially fixing said bushing within said hinge eye comprising at least one shoulder portion;

said at least one shoulder portion comprising a first shoulder portion;

said first shoulder portion being disposed adjacent said first surface of said hinge eye;

said at least one opening having a central longitudinal axis and a radial direction substantially transverse to the longitudinal axis of the piston-cylinder assembly;

said at least one opening comprising a periphery disposed radially from the central longitudinal axis of said at least one opening to receive a connecting shank;

said bushing comprising a single, solid piece;

said at least one retaining tab being integral with said periphery immediately adjacent said at least one retaining tab of said at least one opening; and said integral combination of said at least one retaining tab and said periphery being one homogeneous, molded material.

* * * * *

UNITED STATES PATENT AND TRADEMARK OFFICE
CERTIFICATE OF CORRECTION

PATENT NO. : 5,735,373
DATED : April 7, 1998
INVENTOR(S) : Alfred K. KLEIN, Peter THURMANN, Horst KAUFMANN, Jörg GUSTKE, and Horst MAURY It is certified that error appears in the above-identified patent and that said Letters Patent is hereby corrected as shown below:

In column 4, line 6, after 'FIGS.', delete "4A-D" and insert --4A-4D--.

In column 4, line 57, after 'which', delete "i.e." and insert --is--.

In column 6, line 40, after 'eye', delete "characterised" and insert --characterized--.

In column 10, line 39, Claim 13, after 'claim', delete "2," and insert --12,--.

Signed and Sealed this

Eighteenth Day of August, 1998

Attest:

BRUCE LEHMAN

*Attesting Officer*  *Commissioner of Patents and Trademarks*